Nov. 30, 1965  C. F. AULT  3,221,234
SERIES MOTOR WITH SPEED-CONTROLLING SHUNT FOR THE ARMATURE
Filed Oct. 17, 1962  2 Sheets-Sheet 1
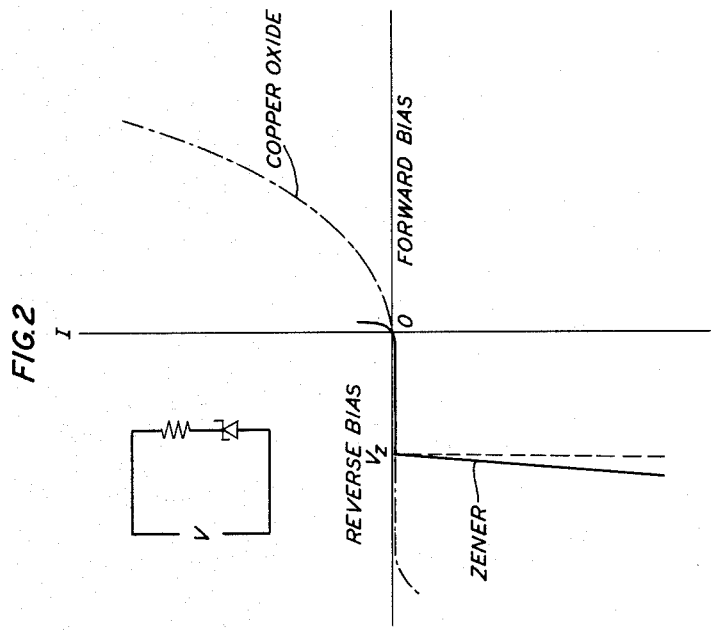
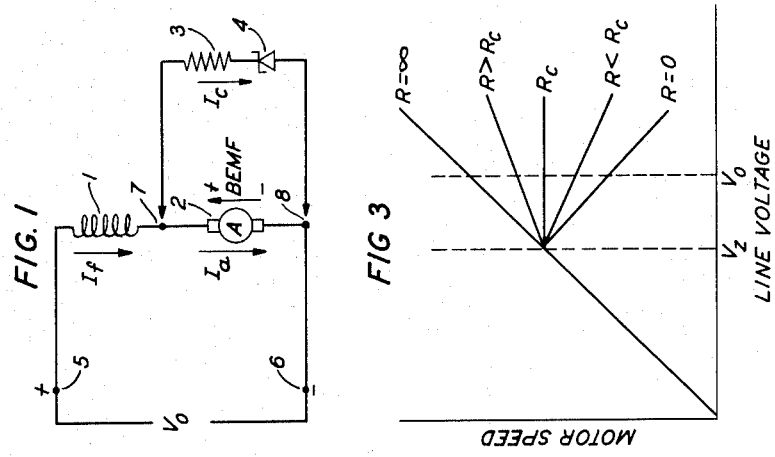
INVENTOR
C. F. AULT
BY
ATTORNEY Nov. 30, 1965   C. F. AULT   3,221,234
SERIES MOTOR WITH SPEED-CONTROLLING SHUNT FOR THE ARMATURE
Filed Oct. 17, 1962   2 Sheets-Sheet 2
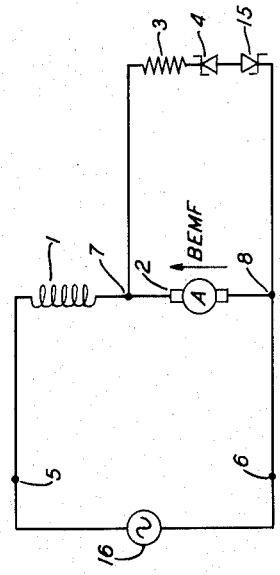
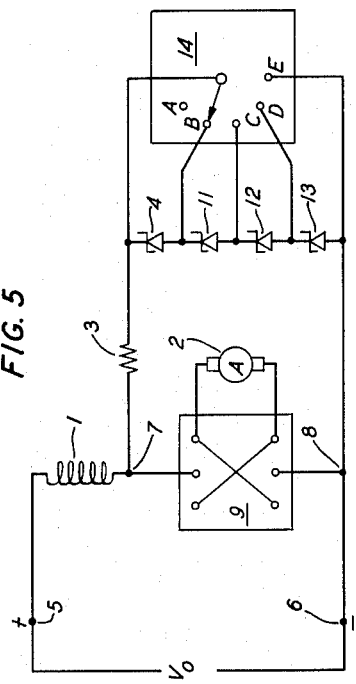
INVENTOR
C. F. AULT
BY
ATTORNEY

United States Patent Office 3,221,234
Patented Nov. 30, 1965

3,221,234
SERIES MOTOR WITH SPEED-CONTROLLING SHUNT FOR THE ARMATURE
Cyrus F. Ault, Lincroft, N.J., assignor to Bell Telephone Laboratories, Incorporated, New York, N.Y., a corporation of New York
Filed Oct. 17, 1962, Ser. No. 231,158
3 Claims. (Cl. 318—250)

This invention relates to motor control and more particularly to speed regulation of series motors.

The series motor, having high starting torque and compatibility with either alternating or direct current, is often preferable to other motors. However, its very poor speed stability in the presence of varying loads and line voltages greatly limits its use where constant speed is desirable.

The speed instability of the series motor is inherent because current changes in the armature due to speed variations necessarily produce identical current changes in the field winding. Those current changes in the field winding produce changes in field flux which, in turn, magnify the speed changes.

While the series motor exhibits this basic instability for both load and line voltage variations, previous efforts to improve its speed regulation have been directed toward improving only the speed/load characteristic.

A representative device for improving the speed/load characteristic is a circuit to be connected in parallel with the armature and admitting a current which varies inversely with that of the armature. A circuit having this property may contain a silicon rectifier or some similar nonlinear conducting device whose impedance decreases with applied voltage. Because this circuit maintains the field current and armature voltage substantially constant, the speed/load characteristic of the motor becomes similar to that of a shunt motor.

However, these previous devices, so far as they are known, do not alleviate the instability caused by line voltage variations and may instead aggravate it. Because the armature voltage must remain fixed by the conducting device in parallel with it, line voltage variations must be reflected across the field winding. Since the inherent series resistance of the field winding is generally very small, the field current fluctuations must be large. As a result, large speed variations are produced which are in directions opposite to those produced with no control circuit.

It is therefore the object of this invention to stabilize the running speed of a series motor at a desired speed which is independent of variations in both load and line voltage.

In accordance with the invention the above object is accomplished by a speed control circuit connected across the terminals of the armature winding. The circuit comprises a fixed resistance and a nonlinear conducting device having an impedance which decreases with the voltage across it. Changes in line voltage produce impedance changes in the control circuit which, in turn, produce changes in the field current. The magnitude of the changes in field current relative to the magnitude of line voltage fluctuations is determined by a control resistor. A value of the control resistance, relative to other motor impedances, may be chosen which will produce field currents necessary to oppose any tendency to change speed due to line voltage fluctuations.

Speed regulation for varying loads is simultaneously provided by the same circuit. Any change in speed will cause a corresponding change in the back electromotive force produced in the armature. Because it is the BEMF which biases the nonlineaer conducting device, current in the control circuit will reflect any speed change. Current changes in the control circuit will, in turn, cause changes in field current which will tend to oppose the speed change, thus providing a much improved speed/load stability.

A better understanding of the object and advantages of the invention may be derived from the detailed description that follows when considered with reference to the attached drawing, in which:

FIG. 1 is a circuit diagram of a series motor and motor speed controller;

FIG. 2 is a graph of current versus voltage for representative nonlinear conductors;

FIG. 3 is a graph of motor speed versus line voltage for relative values of control resistance;

FIG. 4 is a circuit diagram of a series motor powered by a line voltage of varying polarity; and FIG. 5 is a circuit diagram of a reversible series motor with a variable speed controller.

A preliminary discussion of the characteristics of series motors in the absence of means for speed control will provide a better understanding and appreciation of the invention.

The running speed of the series motor is determined by both the load and the line voltage. At the running speed the power consumed, neglecting that wasted in electrical and mechanical friction, is equal to the armature BEMF times the armature current. The BEMF, on the other hand, is determined by the armature speed and the field current which produces the flux through which the armature turns. Should the load or the line voltage be altered, some new speed will be established which produces different values of BEMF and armature current which satisfy the power relationship. In the series motor, running speed and BEMF vary directly with line voltage and inversely with values of load applied. As line voltage increases, speed increases until some higher value of BEMF is produced which, with a new value of armature current, will satisfy the power equation. As BEMF begins to increase, however, the reduction in armature current necessarily reduces field current as well. Because field current is being diminished, thus reducing the effect of speed increase upon BEMF, the change in speed necessary to achieve the higher BEMF must be greater than would have been necessary had the field current not diminished. The relatively good speed regulation of the shunt motor is accounted for by the fact that its field current is increased rather than diminished with an increase in line voltage.

The same instability of the series motor, inherent because of the series relationship of armature and field, can be demonstrated for load changes. As load is reduced, and motor speed increases to effect a higher BEMF, field current is decreased and the required speed change is proportionately increased. Speed increases so rapidly with load reduction that the motor speed may increase to an unreasonable value unless a nominal load is maintained. A similar analysis will show that motor speed will decrease rapidly with an increase in load.

Again, the shunt motor, having a field current independent of the load, displays a much better speed/load characteristic than does the series motor.

Referring now to the drawing, FIG. 1 shows a series motor having a field winding 1, an armature 2, and terminals 5 and 6 for receiving a line voltage $V_0$. The speed control circuit, comprising a fixed resistor 3 and a nonlinear conducting device 4, is connected across the armature terminals 7 and 8.

The nonlinear impedance device 4 exhibits a negligible impedance to current flow in one direction and when so conducting is said to be forward biased or positively biased. Its impedance to current flow in the opposite direction, when it is said to be negatively biased or reverse biased, is nonlinear and is a function of the negative bias.

FIG. 2 is a graph showing the current/voltage characteristics of two kinds of nonlinear conducting devices. The curve denoted Copper Oxide is representative of one type of nonlinear conductor which has an impedance which decreases along a smooth curve as the applied voltage is increased. For these devices the applied voltage shown is a forward bias. The curve denoted Zener is representative of those devices which display a very large impedance for reverse biases below a particular value. The particular value of reverse bias at which conduction begins is called the zener voltage, $V_z$. It can be seen from FIG. 2 that as reverse bias is increased beyond the zener voltage, impedance decreases at such a sharp rate that voltage across the device tends to remain nearly constant, and the increased current causes the increase in applied voltage to be reflected across the resistance R. It is this constant voltage characteristic that makes it possible to regulate current in a particular way by choosing a particular value of fixed resistance, R. It has been found that it is possible to select a value of control resistance R relative to other motor impedances which will cause the current through the control circuit to vary in a manner which will provide nearly ideal compensation for line voltage over fluctuations.

The very sharp knee in the zener curve makes that type device particularly useful for motor control for another reason, also. Because the constant voltage non-linear device conducts no appreciable current until a particular voltage is applied, the device provides no control until the desired running speed is reached. This means that the motor accelerates to the running speed promptly rather than asymptotically as would be true of devices having a smooth impedance curve. While the circuit will be described as comprising a zener diode, it should be understood that any nonlinear conducting device having a constant voltage characteristic could be employed.

In the motor control circuit connected across the armature as shown in FIG. 1, the nonlinear conductor 4 has a voltage across it which is of the polarity of the armature BEMF and, according to convention, is said to be reverse or negatively biased.

When $V_o$ is applied with the armature at rest, the BEMF is zero and field current $I_f$ is large. The control circuit current $I_c$ is initially zero and will remain so as the motor accelerates until the BEMF becomes equal to the zener voltage required for conduction by the conducting device 4. When BEMF becomes equal to the zener voltage, the diode 4 will begin to conduct and its constant voltage characteristic will oppose any further increase in BEMF. When the motor is at its running speed, determined by the load and the line voltage, field current $I_f$, will be equal to the sum of armature current $I_a$ and control circuit current $I_c$. Should the line Voltage $V_o$ increase, the voltage increase between the armature terminals 7 and 8 will cause control circuit current $I_c$ to increase, thus increasing field current $I_f$. By properly proportioning the control circuit resistor 3 to other motor impedances, the increase in field current can be made exactly that needed to produce the increased BEMF without a change in speed. This value of control circuit resistance is called the critical resistance $R_c$. As previously stated, in control circuits directed only to compensation for change loads from which a resistance was omitted, field current may increase so greatly that motor speed will actually decrease.

FIG. 3 is a graph of motor speed verus line voltage for relative values of control circuit resistance. For a control circuit resistance equal to the critical resistance $R_c$, constant speed is maintained for varying values of line voltage $V_o$. No control is possible, of course, below the zener conducting voltage $V_z$, and motor speed falls to zero as line voltage decreases below it. It will be noted that for values of control circuit resistance R larger than $R_c$, motor speed varies directly with line voltage $V_o$; the line $R=\infty$ represents the motor speed characteristic with no control circuit. Conversely, for values of control circuit resistance R smaller than $R_c$, motor speed varies inversely with line voltage $V_o$; the line $R=0$ shows the motor speed characteristic produced by previous control circuits with no control circuit resistance R.

The value of $R_c$ is found to be near that of the series resistance of the field or armature winding. For a small motor these values may be several ohms and for large motors something less than one ohm. The precise value may be determined easily by using a variable resistor and observing the speed characteristics as its value is changed. The value of $R_c$ is not so critical, however, that the control circuit cannot be designed and manufactured for a motor type whose representative impedances are known.

Referring again to FIG. 1, it can be shown that a speed control circuit according to the principles of this invention also provides speed stability in the presence of varying loads. Should the load decrease and the motor speed tend to increase, the increased BEMF would reduce the armature current $I_a$. However, the increased BEMF would simultaneously decrease the control circuit impedance causing $I_c$ to increase. Field current $I_f$, being the sum of armature current $I_a$ and control circuit current $I_c$, would tend to remain nearly constant. Because the field current does not decrease, the speed change necessary to produce the increased BEMF required is relatively small. Should the load be totally removed, motor speed will not increase to an unreasonable value but will remain limited by the control circuit.

By the a similar analysis, an increase in load will cause the BEMF to decrease slightly thus increasing armature current. The control circuit impedance will be increased and the control current $I_c$ correspondingly decreased; field current $I_f$ will remain substantially constant.

Thus the combination of series motor and control circuit exhibits some of the desirable speed characteristics of the shunt motor. Unlike the shunt motor, however, a very large load will not damage the motor. Should motor speed fall so low that the BEMF produced will not cause the control circuit to conduct, control will be lost, but the high torque characteristic of the series motor will still remain.

The direction of rotation of the series motor is determined by both the field polarity and the direction of armature current. Because a change in line voltage polarity results in a reversal of both parameters, the series motor is compatible with alternating current. Although the direction of motor rotation for either polarity of line voltage or for alternating current is the same, the polarities of the BEMF produced will be opposite thus requiring two nonlinear conducting devices to regulate speed. FIG. 4 shows two nonlinear conductors 4 and 15 installed with opposing polarities.

For a rotation producing the BEMF shown in FIG. 4, the conducting device 4 will be negatively biased and provide speed control. The opposing conducting device 15, being forward biased, conducts freely and has no effect on motor speed. When the line voltage polarity changes, thus changing the polarity of BEMF, conducting device 15 will be negatively biased and provide speed control.

It is possible, however, to reverse the direction of motor rotation by reversing the polarity of one winding. FIG. 5 shows a reversing switch 9 for changing the direction of current flow through the armature. Although motor rotation is reversed and the polarity of BEMF is changed, the polarity of the potential between armature terminals 7 and 8 remains the same. Thus the nonlinear conductors 4, 11, 12 and 13 need be of only one polarity.

It was pointed out earlier that the running speed established by the nonlinear conducting devices is determined by the voltage at which they begin to conduct. Should several discrete running speeds be desired, several devices may be used in series and means provided for selecting a combination of them. When used in series the conducting voltage for the combination will be the sum of the individual conduction voltages.

An arrangement for providing various discrete running speeds is shown in FIG. 5. A rotary switch 14, having positions A, B, C, D and E, allows selection of four discrete running speeds by shorting out one or several of the conducting devices 4, 11, 12 and 13.

The series motor may be braked while under full load by shorting the armature terminals. In FIG. 5 braking may be accomplished by placing the rotary switch 14 in its shorting position E.

It is to be understood that the above-described arrangements are illustrative of the application of the principles of the invention. Numerous other arrangements may be devised by those skilled in the art without departing from the spirit and scope of the invention.

What is claimed is:

1. In combination with a series motor having field and armature windings, means for applying a load to said motor, means for applying a potential difference to said windings, and a motor speed regulator circuit connected in shunt with said armature winding, said speed regulator circuit comprising a series combination of a linear resistor and a nonlinear breakdown device that is substantially nonconductive until the voltage across said breakdown device is at least as great as the breakdown voltage of said device, said breakdown device having an impedance that decreases as said voltage across said breakdown device increases in excess of said breakdown voltage, said linear resistor having a resistance proportioned to produce speed-compensating changes in the current of said field winding and the back electromotive force of said armature winding in response to changes in said applied potential difference.

2. The combination according to claim 1 in which the nonlinear breakdown device includes at least one Zener diode connected in a polarity to be reversed-biased by the back electromotive force of said armature winding.

3. The combination according to claim 2 in which the resistance of the linear resistor is of the same order of magnitude as the respective resistances of the field and armature windings.

References Cited by the Examiner
UNITED STATES PATENTS 1,961,940   6/1934   O'Hagan _____ 318—250

ORIS L. RADER, *Primary Examiner.*